Figure 1:
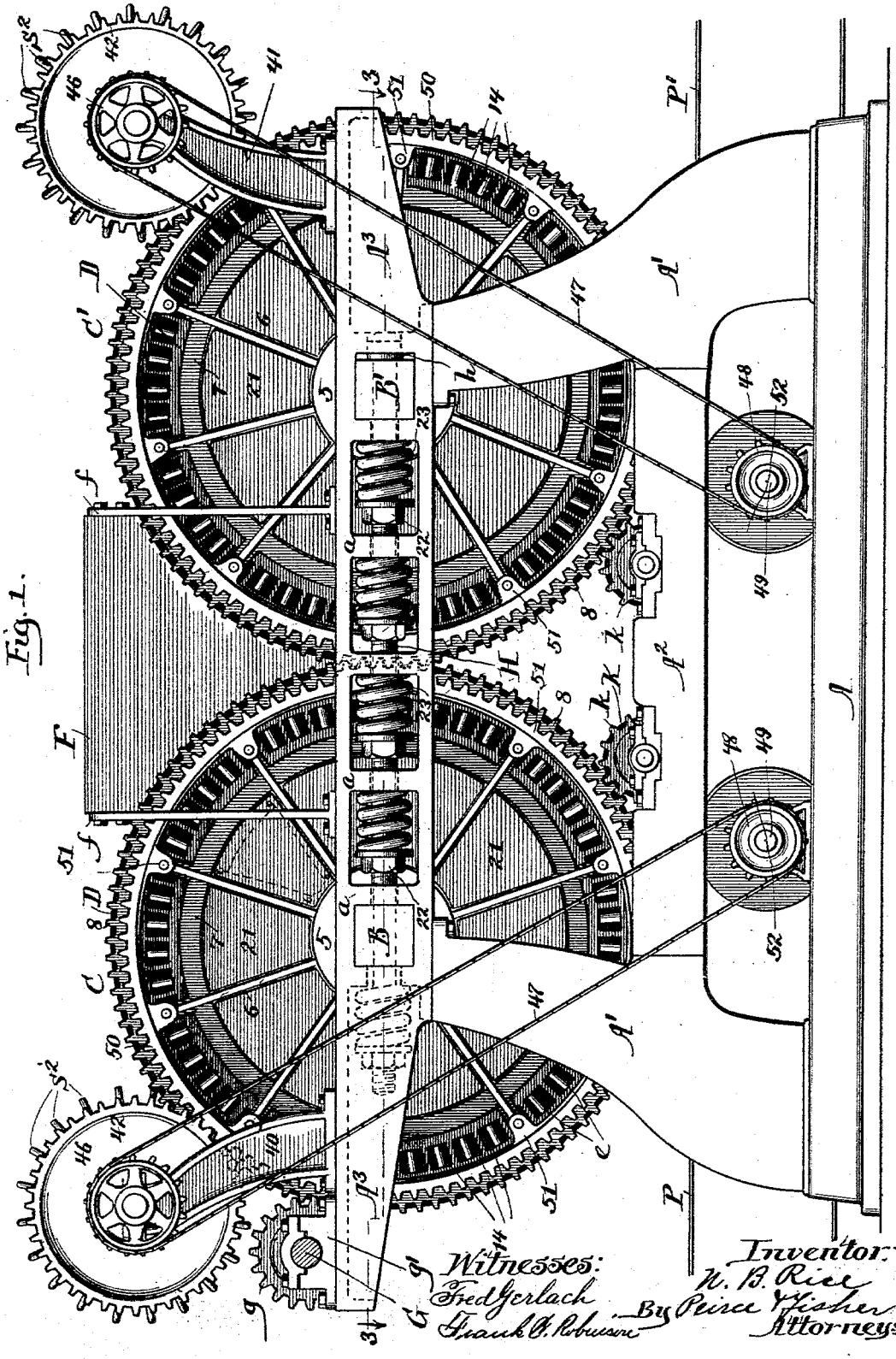

(No Model.)  6 Sheets—Sheet 1.

N. B. RICE.
BRICK MACHINE.

No. 516,023. Patented Mar. 6, 1894.

Witnesses:
Fred Gerlach
Frank C. Robinson

Inventor:
N. B. Rice
By Peirce & Fisher
Attorneys.

(No Model.) 6 Sheets—Sheet 2.
N. B. RICE.
BRICK MACHINE.
No. 516,023. Patented Mar. 6, 1894.
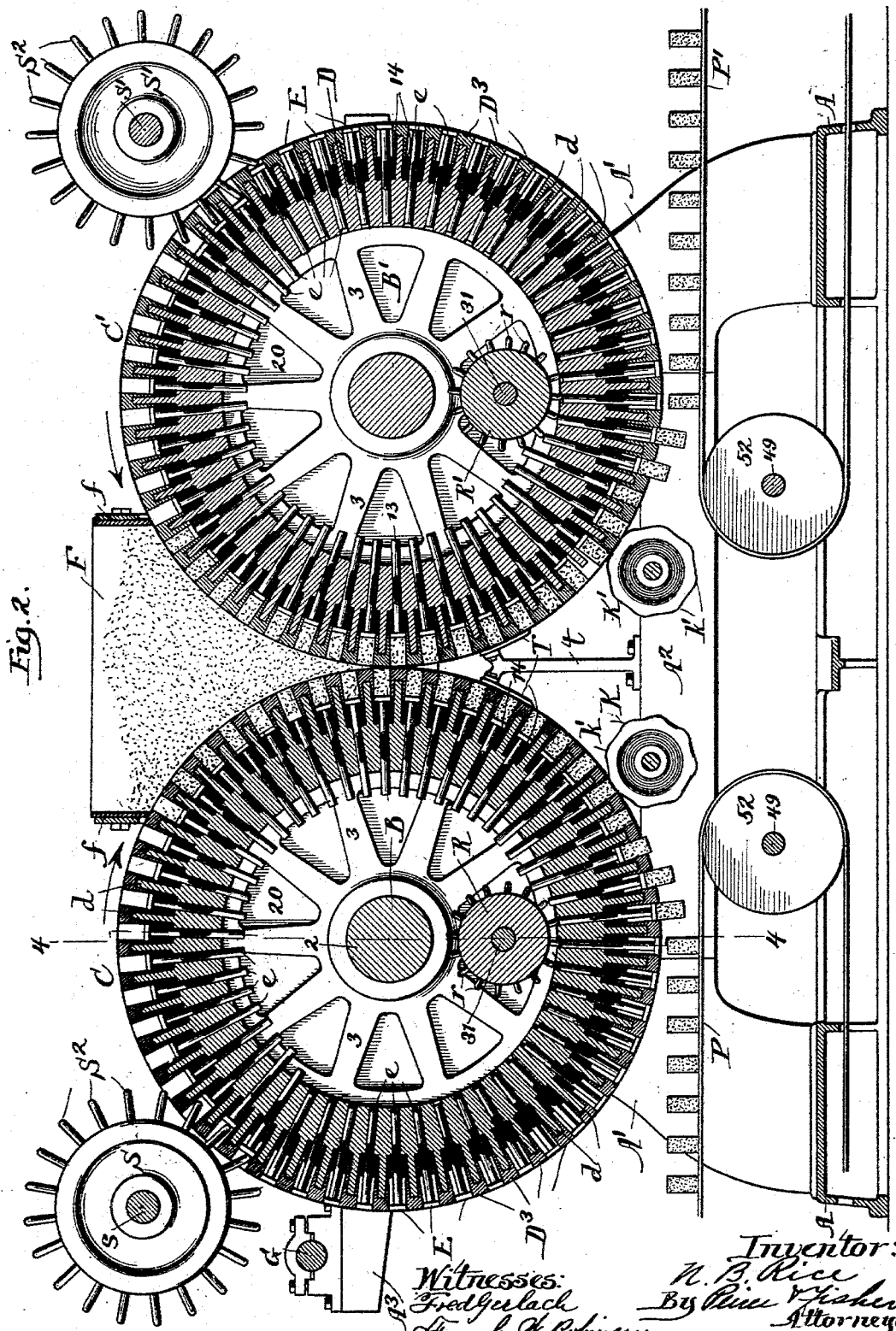

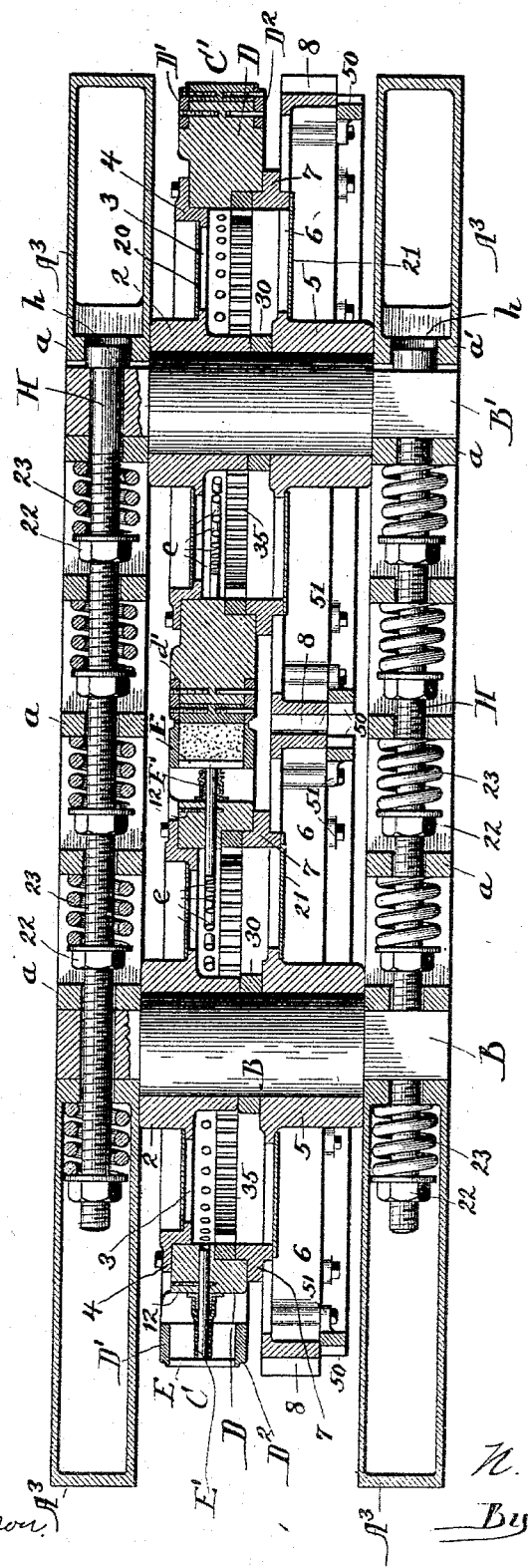

(No Model.)  6 Sheets—Sheet 4.
N. B. RICE.
BRICK MACHINE.
No. 516,023.  Patented Mar. 6, 1894.
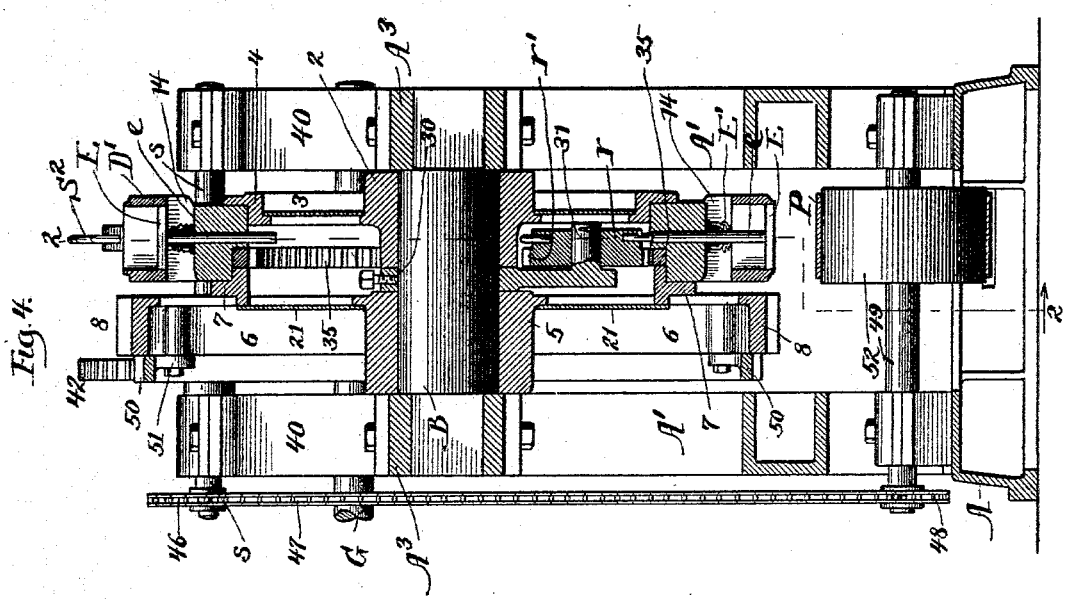

(No Model.) 6 Sheets—Sheet 5.
N. B. RICE.
BRICK MACHINE.
No. 516,023. Patented Mar. 6, 1894.
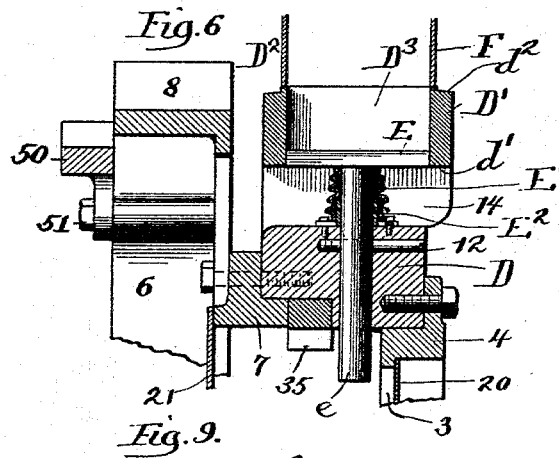
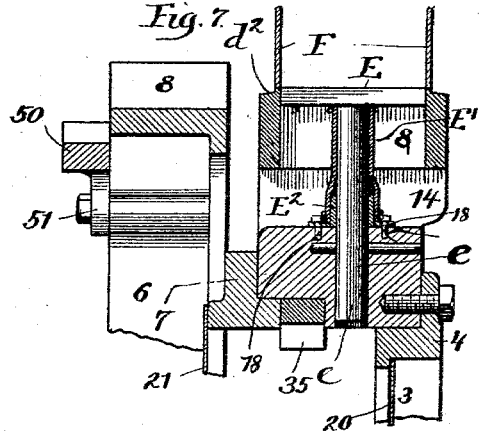
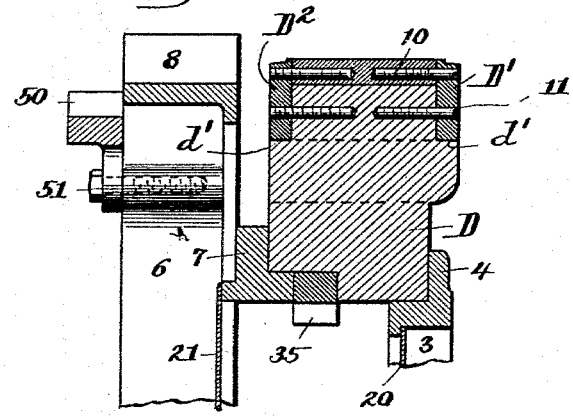
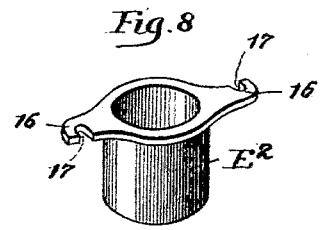
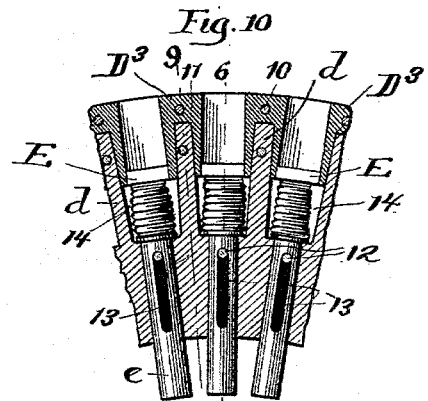
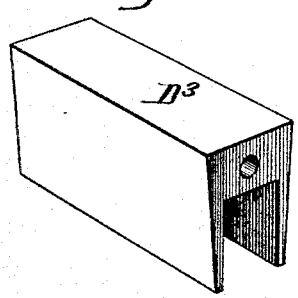
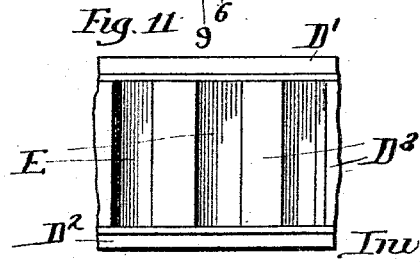
Witnesses:
Fred Gerlach
Frank V. Robinson
Inventor:
N. B. Rice
By Peirce & Fisher
Attorneys.
THE NATIONAL LITHOGRAPHING COMPANY,
WASHINGTON, D. C.

(No Model.)  
N. B. RICE.  
BRICK MACHINE.  
No. 516,023. Patented Mar. 6, 1894.
6 Sheets—Sheet 6.
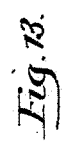
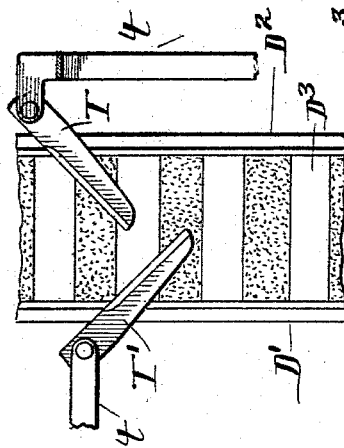
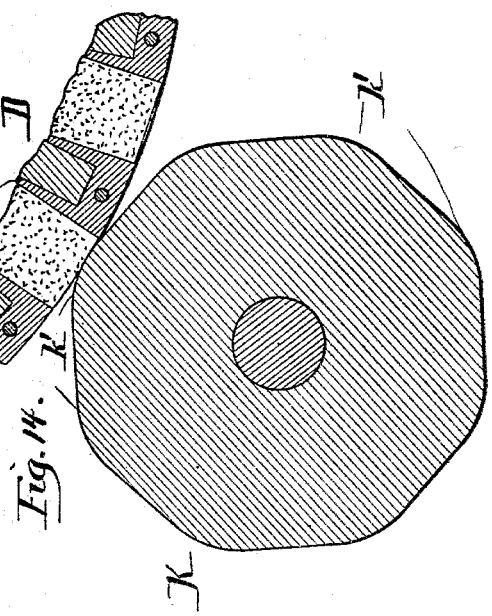
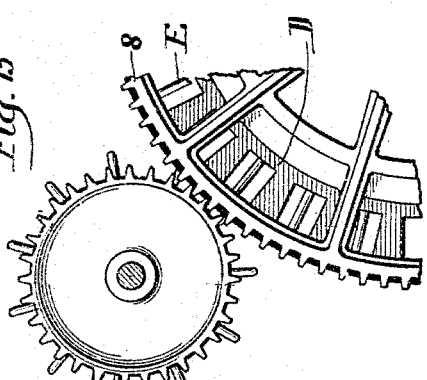
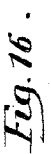
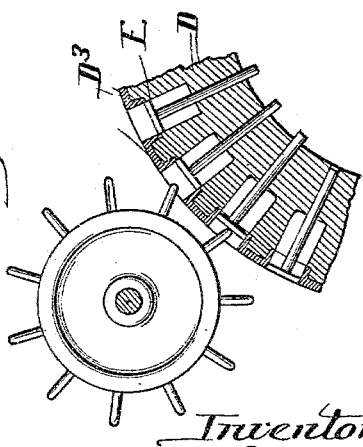
Witnesses:  
Fred Gerlach  
Frank H. Robinson  
Inventor:  
N. B. Rice  
By Peirce & Fisher  
Attorneys.
THE NATIONAL LITHOGRAPHING COMPANY,  
WASHINGTON, D. C.

UNITED STATES PATENT OFFICE.

NATHANIEL B. RICE, OF CHICAGO, ILLINOIS.

BRICK-MACHINE.

SPECIFICATION forming part of Letters Patent No. 516,023, dated March 6, 1894.

Application filed September 21, 1892. Serial No. 446,384. (No model.)

*To all whom it may concern:*

Be it known that I, NATHANIEL B. RICE, a citizen of the United States, residing at Chicago, in the county of Cook and State of Illinois, have invented certain new and useful Improvements in Brick-Machines, of which I do declare the following to be a full, clear, and exact description, reference being had to the accompanying drawings, forming part of this specification.

My present invention is directed more particularly to the improvement of that type of brick machines wherein the molding of the clay is effected by wheels the peripheries of which are provided with a series of molds that receive the clay from a certain hopper.

My invention consists in various novel features of construction, hereinafter described, illustrated in the accompanying drawings, and particularly pointed out in the several claims at the end of this specification.

Figure 1 shows a side elevation of my improved machine. Fig. 2 is a view in vertical longitudinal section on line 2—2 of Fig. 4. Fig. 3 is a view in horizontal section on line 3—3 of Fig. 1. Fig. 4 is a view in vertical cross section on line 4—4 of Fig. 2. Fig. 5 is a detail view in side elevation of the gearing within the mold wheels, a part of the rim of one wheel being shown. Fig. 6 is a view in section on line 6—6 of Fig. 10. Fig. 7 is a view similar to Fig. 6, but showing the plunger raised. Fig. 8 is a detail perspective view of the detachable ring that encircles each plunger. Fig. 9 is a sectional view on line 9—9 of Fig. 10. Fig. 10 is a view in central vertical longitudinal section through a part of one of the mold wheels. Fig. 11 is a plan view of the parts shown in Fig. 10. Fig. 12 is a detail perspective view of one of the cap plates of the mold wheels. Fig. 13 is a detail view of part of one of the mold wheels with the scrapers in front thereof. Fig. 14 is an enlarged detail view in section of one of the supplemental presser rollers. Fig. 15 is a detail side view showing modified mold wheel and spin wheel which may be used when bricks are molded flatwise. Fig. 16 is a sectional view of parts shown in Fig. 15.

The main frame of the machine, which may be of any suitable construction, is shown as comprising a bed-plate A from which rise the standards A', that are united together by the lower side bars $A^2$ and the upper side bars $A^3$, these upper bars resting upon the top of the standards A'. The side bars $A^3$ are preferably formed with the cross plates or webs $a$, and with suitable openings to admit the ends of shafts, B and B', on which are mounted, in manner free to revolve, the mold wheels C and C' of the machine. As these mold wheels are of like construction a description of one will answer for both.

Each of the mold wheels comprises a hub 2 in piece with which are cast the spokes 3 and ring 4. The ring 4 is of angular cross section, as shown, and to this ring is bolted the rim D of the wheel. Upon each of the shafts B and B' is also loosely mounted the hub 5 from which project the spokes 6 and in piece with these spokes are preferably cast the ring 7 and gear wheel 8. The ring 7 is of the angular shape shown in cross section and is bolted to the rim D opposite the ring 4 and aids in sustaining this rim. The rim D of each of the mold wheels is preferably formed, as illustrated more particularly in Figs. 6, 7, 9 and 10 of the drawings, that is to say the outer portion of the rim has transverse ribs or projections $d$ formed with the shoulders $d'$ wherever rest the side plates or rings D' and $D^2$. Each of the transverse ribs $d$ has fitted thereon a detachable cap or plate $D^3$, preferably of the construction shown in Fig. 12. The sides of plates $D^3$ straddle the ribs $d$ and extend thereon a sufficient distance to form the side walls of the molds. The end walls of the molds are formed by the plates or rings D' and $D^2$ that are held in place by the bolts 10 and 11. By constructing the molds in manner above described, I am enabled not only to readily and economically form the molds with smoother faces and sharp corners but with such construction a worn or broken mold can be quickly replaced without serious expense or loss of time.

Within the molds of each of the wheels C and C' are the plungers E that constitute the bottoms of the molds, the stems $e$ of these plungers passing through suitable holes in the rim D and being retained in position therein by the pins 12 that pass through the slots 13 of the plunger stems. Beneath each of the molds of the wheels C and C' is formed an open space 14, the purpose of which is to permit the full escape and removal of particles of clay that may be forced between the plunger and the sides of the mold and which would bank behind the plungers and speedily interfere with their operation.

To guard the bearings of the plunger stems from dust I inclose the upper part of each of these stems with a flexible sleeve E' the lower end of which fits over a rigid sleeve $E^2$ that encircles the plunger stem and is provided with the wings 16 having open sockets 17 to receive the bolts 18 (see Fig. 8). By this preferred construction the flexible sleeves E' can be conveniently held in place in such manner as to thoroughly protect the bearings of the plunger stems and guard against access of dust through such bearings to the interior of the wheels. By preference the spaces between the spokes 3 are closed by the sheet metal plates 20 bolted to the flanges of these spokes and of the hub 2 and ring 4, and in like manner the spaces between the spokes 6 are closed by the plates 21 bolted to the flanges of the hub 5, the spokes 6 and the ring 7, so that access of particles of dust to the interiors of the mold wheels and gearing and parts thereon is guarded against.

The gear wheels 8 of the mold wheels C and C' meshing together as they do, serve to effect the accurate unison movement of these wheels and insure that in operation the cap plates $D^3$ of the wheel C shall come opposite the molds of the wheel C' and vice versa, so that the molds of each wheel shall be compactly filled with the clay as the molds pass beneath the hopper F in which the supply of clay is held. This hopper F is sustained by the brackets $f$ that rise from the side bars $A^3$ of the machine and, as seen in Figs. 6 and 7, the end walls of the hopper bear snugly against the peripheries of the rings D' and $D^2$ while the side walls of the hopper extend over the peripheries of the wheels C and C'. It will be observed that the end walls of the hopper are in vertical line with the end walls of the molds and the peripheries of the rings D' and $D^2$ are reduced outside the walls of the hopper as at $d^2$ so that the banking of clay between the opposite parts of the mold wheels is avoided. The gear wheels 8 and the mold wheels C and C' have revolution imparted thereto by the pinion $g$ keyed to the main drive shaft G that is journaled in suitable bearings $g'$ on the side bars $A^3$ of the main frame.

Both of the shafts B and B' of the mold wheels are stationary or non-revoluble; but as it sometimes happens that particles of iron or other hard material enter the hopper F and between the wheels, it is desirable that while provision is made for holding the mold wheels normally in close bearing, a slight separation of the mold wheels shall be permitted to allow such particles to pass without breaking the molds, and for this reason the shaft B' of one of the mold wheels C' is sustained in such manner as to permit the wheels C' to be forced slightly away from the wheel C. By referring more particularly to Figs. 1, 3 and 4 of the drawings it will be seen that the ends of the shafts B and B' are perforated and through them pass the ends of the rods H, the heads $h$ of these rods bearing against the sides of the shafts B'. The rods H pass through the webs $a$ on the inner sides of the side rails $A^3$ and the rod is threaded to receive the nuts 22 which compress the coil springs 23 that encircle the rods H and give to these springs the desired tension for causing the rods H to hold the mold wheel C' in proper bearing with respect to the companion mold wheel C. By using a series of springs 23 with individual adjusting nuts, as I prefer to do, I am enabled to obtain with springs of comparatively small size an effective and easily controlled tension for holding together the mold wheels, whereas if single springs of proper power were employed they would necessarily be very large and difficult of adjustment. After the molds of the wheels C and C' have been filled by their passage through the hopper, the molds of each wheel will come coincident with the crowns of the plates $D^3$ of the other wheels at the point of contact of the wheels and as a consequence the clay will be firmly compacted within the molds.

In order to give a perfectly flat surface to the outer edge of the bricks before they leave the molds I provide the supplemental presser rolls K and K', the shafts of which are journaled in suitable bearings on the side bars $A^2$ of the main frame and by means of the pinions $k$ receive motion from the main gear wheels 8. Each of these supplemental presser rolls K and K' has its periphery formed with the longitudinal raised portions $k'$ with faces curved more abruptly than the curvature imparted to the exposed edges of the clay within the molds by the opposite solid portions of the mold wheels and these raised portions $k'$ consequently serve to flatten the edges of the bricks.

In order to effect the discharge of the molded bricks from the mold wheels onto the carrier belts P and P', or other suitable receptacles, I provide the novel mechanism next to be described for forcing outward the plungers. Upon each of the shafts B and B' and between the hubs 2 and 5 is fixed a hanger 30 having a lateral stud 31 on which is journaled the discharge wheel R. The periphery of this wheel R is provided with a series of spurs or projections $r$ adapted to contact with the stem $e$ of the plungers E and force outward these plungers to cause them to deliver the molded bricks onto the carrier belts P and P'. The wheels R and R' are provided also with pinions $r'$ that mesh with the internal gear wheels 35 affixed to the interiors of the rims D and D' of the mold wheels C and C'. These pinions and gear wheels insure the unison movement of the discharge wheels R and R' with the mold wheels, and being located within the rims of these wheels are effectively guarded from becoming fouled. After the plungers E have been forced outward to discharge the bricks it is necessary to force them inward again in order to permit the molds to be refilled with clay. For forcing inward the plungers E, I have provided the wheels S and S' keyed to the shafts s and s' journaled upon the ends or the standards 40 and 41 that rise from the side bars A³ of the main frame and are driven by the gear wheels 42 that mesh with gear wheels 50 bolted as at 51 to the spokes 6 adjacent the gear wheels 8. The peripheries of the wheels S and S' are provided with the spurs or projections S², arranged at a distance apart corresponding with the distance between the molds of the mold wheels C and C' and of proper length to force the plungers E to the bottoms of the molds. It will be observed that the gear wheels 50 with which mesh the gear wheels 42, are of smaller diameter than the gear wheels 8 and the gears 42 are of larger diameter than the wheels S and S', the purpose of this construction being to insure the accurate entrance to the requisite depth of the spurs S² into the molds of the wheels C and C'. In the construction shown, the molds of the mold wheels C and C' are arranged to mold the bricks edgewise, this arrangement permitting a larger number of molds to be formed about the peripheries of the wheels, but it is manifest that without departing from my invention the molds could be arranged flatwise, and in such case, inasmuch as the spurs S² do not need to be so long or enter the molds to so great a depth; the supplemental gear wheels 50 may be omitted and the spur wheel S be driven direct by the gear wheels 8, as shown by the modification illustrated in Figs. 15 and 16 or in drawings. Preferably the shafts s and s' are furnished with sprocket wheels 46 which with the sprocket chains 47 and sprocket wheels 48 impart revolution to shafts 49 that carry the drums 52 of the carrier belts P and P'.

In order to remove from the exposed edges of the molded bricks any hard bodies or other particles that may project therefrom, I prefer to employ the scrapers T and T' the construction and arrangement of which are more particularly illustrated in Figs. 2 and 13 of the drawings. These scrapers T and T' are sustained by suitable standards t rising from the cross bars A² of the main frame and each of these scrapers extends partially across the rim of the adjacent mold wheel and at an angle to line of the molds. The scrapers T and T' are arranged one above the other at opposite angles and with their free ends slightly overlapping, so that if any foreign body, such for example as a nail, should project from the clay it would be caught by the scraper T which would force it toward the opposite end of the mold, tending at the same time to withdraw it therefrom until it passed from the scraper T and either drop away or was caught by the scrapers T' and moved in opposite direction and completely withdrawn. By this arrangement all danger of breaking the molds by the jamming of the hard bodies between the scrapers and the edges of the mold, is avoided, the inclination of the scrapers being sufficient to prevent such jamming.

From the foregoing description the operation of the machine will be seen to be as follows: As the mold wheels C and C' are revolved in the direction of the arrows, Fig. 2, the molds within their passage through the hopper F will be filled with clay and inasmuch as the solid portions of the periphery of each mold wheel come opposite the molds in the other wheel the clay will be firmly compacted into the molds. After the molds are thus filled they will pass beneath the scrapers T and T' and in manner above described will have any projecting parts removed therefrom. As the wheels C and C' are of like diameter and their peripheries of uniform curvature it will be found that the outer edges of the bricks within the molds, before their contact with the supplemental rolls K and K', will have a curvature corresponding to that of the mold wheels but as the ridges or raised portions of the supplemental rolls K and K' have a more abrupt curvature than that of the mold wheels they will impart to the bricks flat outer edges. As the filled molds move above the carrier belts P and P', the spur wheels R and R' force outward the plungers E thereby causing the discharge of the bricks from the molds onto the carrier belts. After the bricks are thus discharged the continued revolution of the mold wheels brings the plungers E beneath the spur wheels S' S' which force inward the plungers and leave the molds in readiness to be again filled with clay in their passage through the hopper.

The details of structure above set out may be varied widely by the skilled mechanic without departure from the spirit of the invention and except as particularly specified in the following claims I do not wish the invention to be understood as restricted to such details.

What I claim as new, and desire to secure by Letters Patent, is—

1. In a brick machine, the combination with suitable molds, and plungers within said molds, of vertically flexible sleeves inclosing the plunger stems and connected to their bearings, substantially as described.

2. In a brick machine, the combination with a wheel having molds about its periphery, of plungers within said molds, flexible sleeves encircling the stems of said plungers, rigid sleeves encircling the stems and arranged inside the flexible sleeves, and attached to the bearings for the stems, substantially as described.

3. In a brick machine, the combination with a wheel having molds about its periphery, plungers for forcing the clay from said molds, a perforated bearing rim for said plungers, flexible sleeves encircling the stems of said plungers, and rigid sleeves within said flexible sleeves and detachably connected to said bearing rim, substantially as described.

4. In a brick machine, a mold wheel having its periphery provided with transverse plates, and with side rings, one on each end of said plates, substantially as described.

5. In a brick machine, a mold wheel having its periphery provided with transverse detachable plates forming walls of the molds, substantially as described.

6. In a brick machine, a mold wheel provided with a rim having transverse division plates formed in piece therewith, and provided with removable transverse cap plates, and side rings bolted to said rim at a distance above the bottoms of the transverse plates, whereby the molds are formed with lateral spaces for the escape of particles of dust &c., substantially as described.

7. In a brick machine, the combination of fixed shaft, a mold wheel comprising a rim D, having molds therein, plungers within said mold, a ring attached to the inner portion of said rim, spokes 3, and a hub, for sustaining said ring 4, a second ring 7 also attached to said rim D, and provided with sustaining spokes 6, and hub 5, a hanger 30, mounted on the shaft intermediate said hubs, and a wheel R carried by said hanger and having spurs to contact with the plunger stems, substantially as described.

8. In a brick machine, the combination with a wheel having molds about its periphery and having plungers for forcing the clay from said molds, and having side-plates for closing both sides of said wheel to guard against access of dust, of a spur wheel within said mold wheel for forcing outward the stems of said plungers and provided about its periphery with a gear, a hanger connected to the mold wheel shaft for sustaining said spur wheel and a gear located between the side-plates of the mold wheel for engaging the gear of a spur wheel, substantially as described.

9. In a brick machine, the combination with a wheel having molds about its periphery, and having plungers for forcing the clay from said molds, of a wheel having spurs to enter said molds and force inward the plungers, a gear of slightly smaller diameter than the mold wheel and a gear on said spur wheel for engaging said gear that is of slightly smaller diameter than the mold wheel, whereby the accurate entrance of the spurs into the molds to the desired depth is secured, substantially as described.

10. In a brick machine, the combination of two wheels having around their peripheries a series of molds and intermediate plain faces, suitable scrapers for said mold wheels, and two presser wheels of smaller diameter than the mold wheel, said presser wheels having abruptly curved raised ribs across their peripheries to impart flat faces to the clay within the molds, and fixed bearings for said presser wheels, substantially as described.

11. In a brick machine, the combination with the two mold wheels, of rods attached to shaft of one at least of said mold wheels, a series of springs on said rod and a series of nuts on said rods for adjusting said springs, substantially as described.

12. In a brick machine, the combination with a mold wheel, of opposite inclined scrapers, substantially as described.

NATHANIEL B. RICE.

Witnesses:
GEO. P. FISHER, Jr.,
FRED GERLACH.